United States Patent
Dirnberger et al.

(10) Patent No.: US 10,662,907 B2
(45) Date of Patent: May 26, 2020

(54) FLUID CONDUCTING SYSTEM

(71) Applicant: MANN+HUMMEL GMBH, Ludwigsburg (DE)

(72) Inventors: Timo Dirnberger, Marbach (DE); Michael Frank, Asperg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/476,046

(22) Filed: Mar. 31, 2017

(65) Prior Publication Data

US 2017/0204820 A1    Jul. 20, 2017

Related U.S. Application Data

(63) Continuation of application No. PCT/EP2015/072768, filed on Oct. 2, 2015.

(30) Foreign Application Priority Data

Oct. 2, 2014    (DE) .......................... 10 2014 014 398

(51) Int. Cl.
*F02M 35/00* (2006.01)
*F02M 35/10* (2006.01)
(Continued)

(52) U.S. Cl.
CPC .... *F02M 35/10262* (2013.01); *F02M 35/021* (2013.01); *F02M 35/0207* (2013.01);
(Continued)

(58) Field of Classification Search
CPC ............ F02M 35/0207; F02M 35/021; F02M 35/10262; F02M 35/10229;
(Continued)

(56) References Cited

U.S. PATENT DOCUMENTS 1,935,445 A * 11/1933 Heinz ....................... G01F 1/20
                                                          200/81 R
3,722,275 A *  3/1973 Rodely ................. G01F 1/3209
                                                          123/198 R
(Continued)

FOREIGN PATENT DOCUMENTS

DE          19960822 A1    12/2000
DE     102013216348 A1     5/2014
(Continued)

*Primary Examiner* — George C Jin
*Assistant Examiner* — Teuta B Holbrook
(74) *Attorney, Agent, or Firm* — James Hasselbeck

(57) ABSTRACT

A fluid conducting system for transport of a fluid has a housing with an inlet for the fluid and an outlet for the fluid. A sensor is arranged in the housing or protrudes from an exterior into the housing and measures a mass flow or a volume flow of a fluid flow that is flowing through the housing from the inlet to the outlet. A filter element is arranged upstream of the sensor in the housing. A fluid channel section has an inlet cross section and an outlet cross section, wherein the fluid channel section is arranged upstream of and in front of the sensor and the outlet cross section adjoins the sensor. The fluid channel section has a tapering cross section tapering from the inlet cross section toward the sensor and accelerating at least a portion of the fluid flow and conducting the fluid flow to the sensor. The tapering cross section of the fluid channel section tapers constantly at least in an area of the outlet cross section in front of the sensor.

5 Claims, 5 Drawing Sheets

(51) Int. Cl.
    *F02M 35/02*         (2006.01)
    *G01F 1/684*         (2006.01)
    *G01F 5/00*          (2006.01)

(52) U.S. Cl.
    CPC .............. *G01F 1/6842* (2013.01); *G01F 5/00* (2013.01); *Y02T 10/146* (2013.01)

(58) Field of Classification Search
    CPC .......... F02M 35/10386; F02M 35/104; F02M 35/02483; F02M 35/08; F02M 35/086; F02M 35/10; F02M 35/10019; F02M 35/10072; F02M 35/044; F02M 35/10209; G01F 5/00; G01F 1/44; G01F 1/00; G01F 1/6842; B01D 2279/60; Y02T 10/146
    USPC .......................... 73/114.31, 114.32, 861, 855
    See application file for complete search history.

(56) References Cited

U.S. PATENT DOCUMENTS

| | | | | |
|---|---|---|---|---|
| 5,029,465 | A * | 7/1991 | Tanimura | G01F 1/3209 73/114.35 |
| 5,369,990 | A * | 12/1994 | Zurek | F02M 35/10019 73/114.32 |
| 5,383,356 | A * | 1/1995 | Zurek | F02D 41/187 73/114.32 |
| 5,546,794 | A * | 8/1996 | Kuhn | G01F 1/6842 73/114.34 |
| 5,672,822 | A * | 9/1997 | Sawada | F02D 41/187 73/114.34 |
| 5,696,321 | A * | 12/1997 | Igarashi | G01F 1/684 73/114.34 |
| 5,789,673 | A * | 8/1998 | Igarashi | G01F 5/00 73/114.34 |
| 6,018,994 | A * | 2/2000 | Yonezawa | G01F 1/684 73/114.34 |
| 6,101,869 | A * | 8/2000 | Kadohiro | F02M 35/021 73/114.32 |
| 6,185,998 | B1 * | 2/2001 | Yonezawa | F02M 35/021 73/114.34 |
| 6,234,015 | B1 * | 5/2001 | Hamada | G01F 1/684 73/202.5 |
| 6,240,775 | B1 * | 6/2001 | Uramachi | G01F 1/6842 73/114.34 |
| 6,619,114 | B1 * | 9/2003 | Lenzing | G01F 1/6842 73/202.5 |
| 6,871,534 | B1 * | 3/2005 | Hamada | F02D 41/185 73/202.5 |
| 8,241,413 | B2 * | 8/2012 | Dirnberger | F02M 35/10386 55/385.3 |
| 2004/0055570 | A1 * | 3/2004 | Bielicki | F02M 35/021 123/402 |
| 2004/0255660 | A1 * | 12/2004 | Abdolhosseini | F02M 33/00 73/114.32 |
| 2015/0300855 | A1 * | 10/2015 | Axelsson | F02D 41/18 73/114.32 |
| 2015/0354512 | A1 * | 12/2015 | Tsujii | G01F 1/6842 73/114.32 |

FOREIGN PATENT DOCUMENTS

| | | |
|---|---|---|
| DE | 102014200654 A1 | 8/2014 |
| JP | 109210749 A | 8/1997 |

\* cited by examiner

FLUID CONDUCTING SYSTEM

CROSS-REFERENCE TO RELATED APPLICATIONS

This application is a continuation application of international application No. PCT/EP2015/072768 having an international filing date of 2 Oct. 2015 and designating the United States, the international application claiming a priority date of 2 Oct. 2014, based on prior filed German patent application No. 10 2014 014 398.8, the entire contents of the aforesaid international application and the aforesaid German patent application being incorporated herein by reference.

BACKGROUND OF THE INVENTION

The invention concerns a fluid conducting system for transporting a fluid, in particular air in the intake tract of an internal combustion engine.

Modern internal combustion engines comprise electronic control units in order to provide for optimal engine performance. In this context, for achieving an optimal motor control, a particularly important sensor is a mass air flow meter for influencing the air intake into the internal combustion engine.

For an optimal engine operation, it is decisive that the air volume throughput measurement is precise. A significant problem that affects the air volume measurement are turbulences in the air flow that can cause a great noise signal ratio. In flow controls according to the prior art, it has been attempted to solve this problem by providing devices that reduce the turbulences of the entire flow field.

Usually, the devices according to the prior art utilize either a grid or screen or an aperture. While the devices according to the prior art that are discussed here reduce the turbulences of the entire flow field, they are sensitive to freezing. Moreover, these devices are cost-intensive in regard to manufacture because a high manufacturing precision is required.

Since the measuring cross section surface of the mass air flow meter that is used in this context is significantly smaller than the channel cross section surface that is flowed through by the air flow, a compensation is performed by characteristic maps which in particular also take into consideration a velocity profile within the channel cross section surface. However, it has been found that fresh air filters which may be arranged in the fresh air channel upstream of the measuring device generate a more or less strong change of the velocity profile in the channel cross section depending on their load state. Such a change of the velocity distribution within the channel cross section surface is however not detected by the mass air flow meter so that, with increasing loading of the air filter, the air mass that is determined by the measuring device deviates more and more from the actual air mass flowing through the fresh air channel.

DE 103 43 892 A1 describes an air induction system installed in a motor vehicle. The air induction system comprises an air filter, a clean air channel, an air volume throughput sensor, a mass air flow meter housing channel, and a flow controller. The flow controller is arranged in the center of the mass air flow meter housing channel. The flow controller is arranged upstream of the mass air flow meter and downstream of the air filter in the air flow path. The flow controller has an inlet for entry of air from the clean air channel and an outlet for exit of the air to the mass air flow meter.

SUMMARY OF THE INVENTION

An object of the invention is therefore to provide a fluid conducting system for transport of a fluid, in particular of air in the intake tract of an internal combustion engine, that makes it possible to measure a mass flow and/or a volume flow of the fluid flowing within the fluid conducting system in a reliable and reproducible way.

A further object is providing a fluid conducting element for use in such a fluid conducting system.

The aforementioned objects are solved by a fluid conducting system for filtering a fluid, in particular of an internal combustion engine, for example, of a motor vehicle, that comprises a housing with an inlet and with an outlet for the fluid into the housing and a sensor arranged in the housing or protruding from the exterior into the housing for measuring a mass flow and/or a volume flow of the fluid flowing in the housing.

Beneficial configurations and advantages of the invention result from the further claims, the description, and the drawings.

A fluid conducting system for transport of a fluid, in particular of air in the intake tract of an internal combustion engine, is proposed that comprises a housing with an inlet for the fluid into the housing and with an outlet. Further, the fluid conducting system comprises a sensor which is arranged in the housing or is protruding from the exterior into the housing for measuring a mass flow and/or a volume flow of the fluid flowing in the housing, as well as a filter element which is arranged upstream of the sensor in the housing. In this context, a fluid channel section of a fluid conducting element is arranged upstream in front of the sensor and adjoins with its outlet cross section the sensor. The fluid channel section comprises a cross section that is tapering from its inlet cross section for the fluid toward the sensor and accelerates at least a portion of the flowing fluid and conducts this portion to the sensor. The cross section tapers constantly at least in an area of the outlet cross section in front of the sensor. The area in which the cross section of the fluid channel section tapers constantly can typically amount to 30% of the length of the fluid channel section, preferably 50%, and particularly preferred to the entire length of the fluid channel section.

In this context, the sensor can be embodied without a housing (so-called plug-in sensor concept). In case of a sensor which is received in an additional HFM housing, the accelerated fluid is conducted to the area of the housing which is open for the fluid. The sensor can be arranged in a pipe section that conducts the flowing fluid to the outlet of the fluid conducting system. The fluid channel section of a fluid conducting element can thus be a component of the pipe section. Alternatively, it can be arranged also within the pipe section. The fluid channel section functions advantageously as a flow stabilizer. Particularly advantageously, the fluid channel section can be embodied to be rotation-symmetrical.

In comparison to the prior art, the fluid conducting system according to the invention has the advantage that, for measuring with sensors the mass flows or volume flows of the fluid flowing through, as e.g. with mass air flow meters, such as hot film mass sensors (HFM), in the air conducting system of an internal combustion engine of a vehicle, a flow grid in front of the sensor is obsolete because of the fluid channel section of the fluid conducting element. This flow grid eliminates usually flow separation and makes the flow of the fluid more uniform with regard to velocity distribution. This applies to a so-called plug-in sensor concept in which a sensor is pushed into the air filter housing as well as to a so-called housing sensor concept in which the sensor is installed fixedly in an HFM housing of an air conducting system. Here, a flow grid is also obsolete. By configuring the fluid channel section with a tapering cross section, tapering constantly from its inlet cross section for the fluid toward the sensor, at least a portion of the flowing fluid is accelerated and conducted at least onto a sensor surface of the sensor which enables a very precise and constant determination of fluid mass values and/or volume values. By selecting a suitable cross section surface of the fluid conducting element, the fluid conducting system can be designed such that at least a portion of the flowing fluid flows through the fluid conducting element and is utilized for measurement while the remaining residual portion of the flowing fluid flows externally past the fluid conducting element.

A disadvantage of the use of a flow grid known from the prior art resides in that even minimal deviations of the geometry of the grid, for example, caused by flashing, have negative effects on the HFM signal. When using a flow stabilizer according to the invention, in particular a conical flow stabilizer, advantageously the flow grid can be eliminated, on the one hand, and, due to the conical shape, an air acceleration which reduces possibly occurring disturbing turbulences can be achieved, on the other hand. In addition, the uniform distribution of the flow rate is significantly improved. As a whole, a significantly more robust concept with regard to air mass measurement is thus obtained for the plug-in sensor concept. On the other hand, a significant reduction of the parts costs is obtained because the flow stabilizer of simple configuration in combination with a plug-in sensor is significantly less expensive than a sensor in an HFM housing.

According to an advantageous embodiment, the fluid channel section can be a component of a fluid conducting element whose inlet cross section captures at least a portion of a total flow cross section of the flowing fluid in front of the fluid conducting element. Such a fluid conducting element as a fluid channel section enables bundling a defined quantity of the flowing fluid and conducting it in a targeted fashion onto a sensor or onto a sensor surface of the sensor which, as a sensitive surface, enables a functional detection of mass flow and/or volume flow. By dividing the fluid flow into at least a portion flowing through the fluid channel section and a portion flowing through the pipe section surrounding the fluid channel section, disturbances of the flow by deflecting effects on the inner wall of the pipe section have no effect on the measured signal. The fluid conducting element is expediently manufactured of a very shape-stable material that maintains its shape even for greater changes of the ambient boundary conditions such as temperature, moisture, vibrations. For example, moisture-insensitive plastic materials such as polybutylene terephthalate with glass fiber reinforcement (PBT GF 35) are conceivable as plastic materials that also have the advantage that they can be manufactured easily and in any shape. Advantageously, the fluid conducting element can be designed to be rotation-symmetrical.

According to an advantageous embodiment, the inlet cross section of the fluid conducting element can capture a portion of a central area of a total flow cross section of the flowing fluid in front of the fluid conducting element. The total flow cross section encompasses the entire fluid quantity that is conducted from the inlet to the outlet, in particular the total flow cross section encompasses thus an inlet cross section into the pipe section in which the sensor is arranged and that guides the flowing fluid to the outlet. By capturing a flow quantity of a central area of the total flow cross section of the flowing fluid, it is possible to achieve a higher precision and constancy of the determined measured value of the fluid mass parameters and/or fluid volume parameters because boundary effects by the housing contours as disturbance parameters are rather negligible.

Alternatively, in another advantageous embodiment, the inlet cross section of the fluid conducting element can capture the total flow cross section of the flowing fluid in front of the fluid conducting element. In this way, it is possible to capture a greater measuring volume and to obtain greater absolute values, which is beneficial in regard to measuring precision. Also, in this configuration it is of no consequence how great the effect of the uncaptured fluid flow is relative to the total fluid flow.

According to an advantageous embodiment, the fluid conducting element can be arranged upstream of the sensor. In this way, it is possible to conduct the fluid flow captured by the fluid conducting element in a targeted fashion onto the sensor and to obtain in this way measured values with high precision and constancy across the operating period of the fluid conducting system.

According to an advantageous embodiment, the sensor can be arranged at least with a portion of the sensor surface within the fluid conducting element. Such an arrangement generates a very homogenous flow in the area of the sensor surface of the sensor because the fluid flow is conducted farther in a targeted fashion also downstream of the sensor. Due to this homogenized flow, the fluid mass values and/or volume values detected by the sensor are very precise and temporally more constant compared to arranging the sensor outside of the fluid conducting element.

According to an advantageous embodiment, the fluid channel section can increase the flow rate of the flowing fluid. The increase of the flow rate of the flowing fluid effects a reduction of turbulences in front of the sensor and thus a reduction of the errors when determining fluid masses and/or volume because boundary effects of the flowing fluid play a smaller role and the turbulent kinetic energy is thus decreased.

According to an advantageous embodiment, the sensor can be arranged to be exchangeable from the exterior in the fluid channel section and/or the fluid conducting element. In this context, it is possible that the sensor is configured to be inserted and removable again from the exterior. However, it can also be glued in, for example, by means of an adhesive that is detachable again. In this way, an exchange of a defective sensor is easily possible without requiring at the same time an exchange of the entire fluid conducting system; this significantly lowers the repair costs for a defective sensor.

According to an advantageous embodiment, the fluid channel section can be configured as a conically tapering pipe wherein the fluid flow enters the greater inlet cross section and the sensor surface of the sensor is arranged adjoining the outlet cross section of the fluid conducting element. In this way, the fluid channel section can be arranged, for example, in the form of a funnel in front of the sensor that then conducts the flowing fluid onto the sensor surface and enables in this way a precise determination of the fluid mass and/or volume. In this context, the outlet cross section can adjoin immediately the sensor or can be arranged at a spacing thereto.

In addition to a conical shape, the inlet opening into the fluid channel section can be shaped in the form of an inflow tulip in order to improve the inflow resistance of the fluid into the fluid channel section. In addition, the inlet opening into the pipe section surrounding the fluid conducting element can also be in the form of an inflow tulip.

According to an advantageous embodiment, a surface of the fluid conducting element which is located in the interior of the fluid channel section can be designed to be turbulence reducing. In addition to the conical shape of the fluid conducting element and a thus imparted increase of the flow rate, such an embodiment of the inner surface of the fluid conducting element, for example, with a type of knobs or in the form of a so-called sharkskin, can make the fluid flow more homogenous and, in this way, significantly reduce the turbulences caused by boundary effects of the fluid flow; this increases, in turn, the measuring precision of the sensor.

According to an advantageous embodiment, a cross section of an inner wall of the fluid channel section can be designed with an aerodynamic profile which increases the flow rate. Also, it is possible by suitable profiling of the inner wall of the fluid conducting element, for example, in the form of an airfoil, to realize an additional increase of the flow rate of the flowing fluid and to increase in this way additionally the measuring precision of the sensor.

According to a further aspect of the invention, a fluid conducting element for use in a fluid conducting system is proposed with a fluid channel section that is arranged upstream in front of a sensor and adjoins with an outlet cross section the sensor. The fluid channel section comprises a cross section which is tapering from its inlet cross section for the fluid toward the sensor and accelerates at least a portion of the flowing fluid and conducts this portion to the sensor. The cross section of the fluid channel section tapers constantly at least in an area of the outlet cross section in front of the sensor. Due to the tapering shape of the fluid channel section, an increase of the flow rate of the flowing fluid can be achieved which reduces the occurring turbulences. In addition, the uniform distribution of the flow rate is significantly improved. As a whole, the precision and constancy of a measurement of fluid mass flows and/or volume flows can be significantly improved.

According to an advantageous embodiment, an opening between inlet cross section and outlet cross section can be provided through which, at least in the operation state, a sensor with at least one sensor surface can protrude into the fluid conducting element. In this way, it is possible to beneficially position the sensor surface, which represents the actual sensitive area of the sensor, in the fluid flow so that the precision and constancy of a measurement of fluid mass flows and/or volume flows can be significantly improved.

According to an advantageous embodiment, an inner wall of the fluid conducting element can comprise an aerodynamic profile which increases the flow rate. By a suitable profiling of the inner wall of the fluid conducting element, for example, in the form of an airfoil, an additional increase of the flow rate of the flowing fluid can be achieved and in this way the measuring precision of the sensor can be additionally increased.

BRIEF DESCRIPTION OF THE DRAWINGS

Further advantages result from the following description of the drawings. In the drawings, embodiments of the invention are illustrated. The drawings, the description, and the claims contain numerous features in combination. A person of skill in the art will consider the features expediently also individually and combine them to meaningful further combinations.

DESCRIPTION OF PREFERRED EMBODIMENTS

Figure 1:
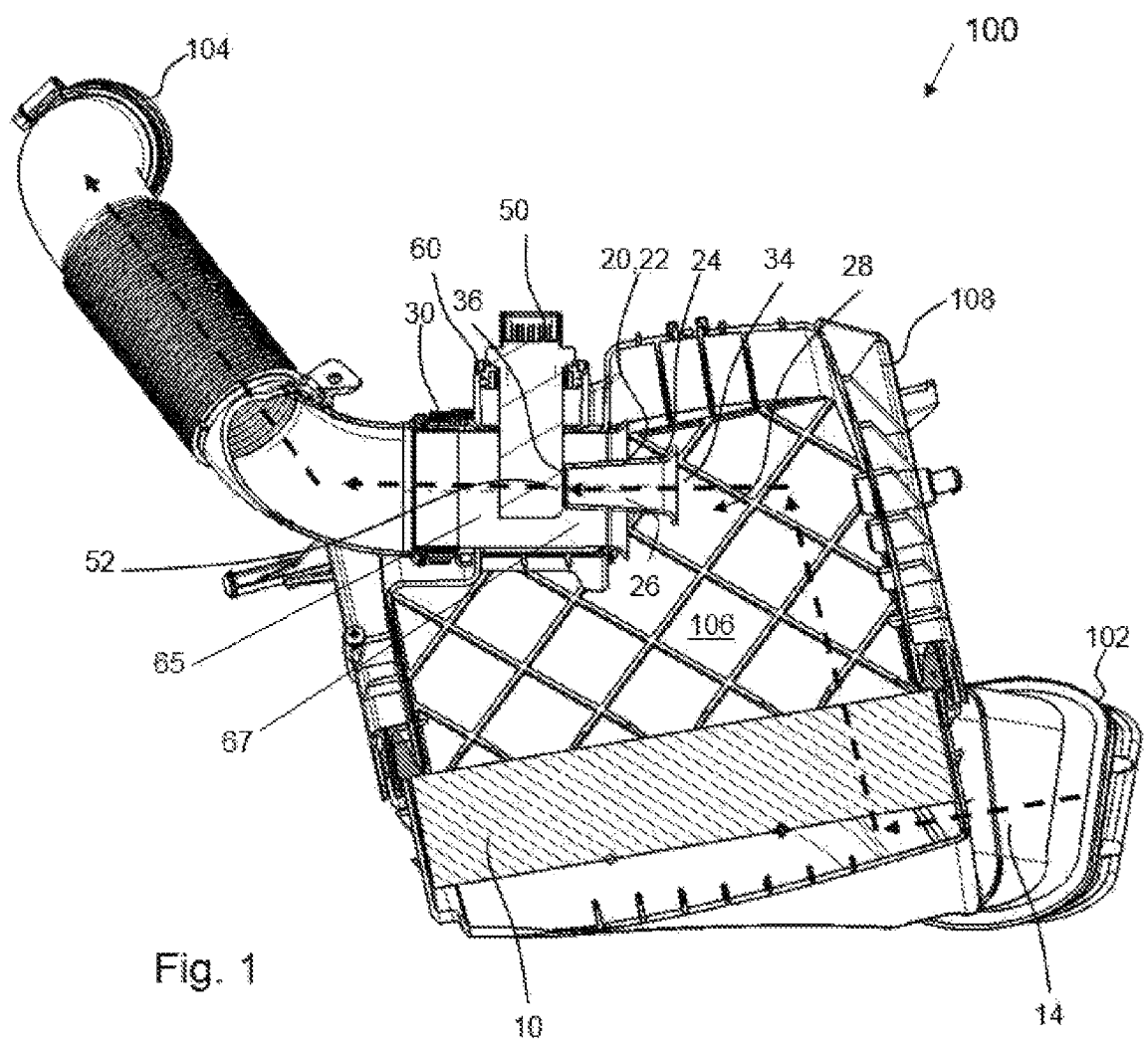
FIG. 1 shows a schematic cross section of a fluid conducting system according to an embodiment of the invention with a fluid conducting element comprising a fluid channel section arranged in front of a sensor and conducting a portion of a fluid flow to the sensor.

In the Figures, same or like components are identified with same reference characters. The figures show only examples and are not to be understood as limiting.

FIG. 1 shows a schematic cross section of a fluid conducting system 100 according to an embodiment of the invention with a fluid conducting element 20 comprising a fluid channel section 22 arranged in front of a sensor 50 and conducting a portion of the fluid flow to the sensor 50.

The fluid conducting system 100 for transport of a fluid, in particular of air as a fluid in the intake tract of an internal combustion engine, comprises a housing 108 with an inlet 102 and with an outlet 104 for the fluid into the housing 108. Moreover, the fluid conducting system 100 comprises a sensor 50 protruding from the exterior into the housing 108 for measuring a mass flow and/or a volume flow of the fluid flowing in the housing 108, as well as a filter element 10 which is arranged upstream of the sensor 50 in the housing 108, wherein a fluid channel section 22 is arranged upstream in front of the sensor 50 and adjoins with its outlet cross section 36 the sensor 50. The fluid channel section 22 comprises a cross section that tapers from its inlet cross section 34 for the fluid toward the sensor 50 and accelerates at least a portion of the flowing fluid and conducts this portion to the sensor 50. The cross section tapers constantly at least in an area of the outlet cross section 36 in front of the sensor 50. The inlet opening into the fluid conducting element 20 has the shape of an inflow tulip. The sensor 50 protrudes into a pipe section 30 that conducts the flowing fluid from the interior 106 of the housing to the outlet 104. The inlet opening into the pipe section 30 also has the shape of an inflow tulip. The fluid channel section 22 is arranged upstream of the sensor 50 at least partially in the pipe section 30. Alternatively, it is also conceivable that the pipe section 30 itself comprises the fluid channel section 22 or constitutes it itself.

The fluid path 14 of the flowing fluid is indicated purely schematically with dashed arrows. The fluid enters through the inlet 102 into the housing 108 and passes through the filter element 10. The filtered fluid can then flow in the interior 106 of the housing 108 through the pipe section 30 to the outlet 104 wherein a portion of the fluid flow flows through the fluid conducting element 20 and is conducted by it to the sensor surface 52 of the sensor 50.

The fluid channel section or inflow tulip 22 is a component of the fluid conducting element 20 whose inlet cross section 34 captures at least a portion of the flowing fluid, namely a portion of a central area of a total flow cross section 28 of the flowing fluid. The total flow cross section 28 encompasses in this context the entire fluid quantity which is passing from the inlet 102 to the outlet 104, in particular the total flow cross section 28 encompasses thus an inlet cross section into the pipe section 30 or outlet duct 30 in which the sensor 50 is arranged and that conducts the flowing fluid to the outlet 104. Between the wall outlet duct 30 and the inflow tulip, an annular flow gap 67 may be formed. The fluid conducting element 20 is arranged upstream of the sensor 50. The fluid channel section 22, as a component of the fluid conducting element 20, is configured as a conically tapering pipe wherein the fluid flow enters the greater inlet cross section 34 and the sensor surface 52 of the sensor 50 is arranged adjoining the outlet cross section 36 of the fluid conducting element or inflow tulip 20. The sensor 50 is arranged in the fluid channel section 22, inserted through a flow sensor receiving opening 60 so as to be exchangeable from the exterior.

The fluid conducting element 20 comprises a fluid channel section forming an accelerated sensor flow channel 22 which comprises a cross section which is constantly tapering from its inlet cross section 34 at an inlet end of the inflow tulip 20 to its outlet cross section 36 and to the sensor surface 52 of the sensor 50. A sensor insertion opening 60 is provided between inlet cross section 34 and outlet cross section 36 through which the sensor 50 protrudes with the sensor surface 52 into the flow sensor receiving chamber 65 of the pipe section or outlet duct 30 fluid conducting element 20.

The fluid channel section 22 increases a flow rate of the fluid flowing in the fluid channel. This can be additionally increased in that the cross section of the inner wall 24 of the fluid channel section 22 is designed with an aerodynamic profile which increases the flow rate, for example, an airfoil profile. Also, it can be expedient to embody a surface of the fluid conducting element 20 located in the interior 26 of the fluid channel section 22 so as to be turbulence reducing in order to achieve a further homogenization of the fluid flow.

Figure 2:
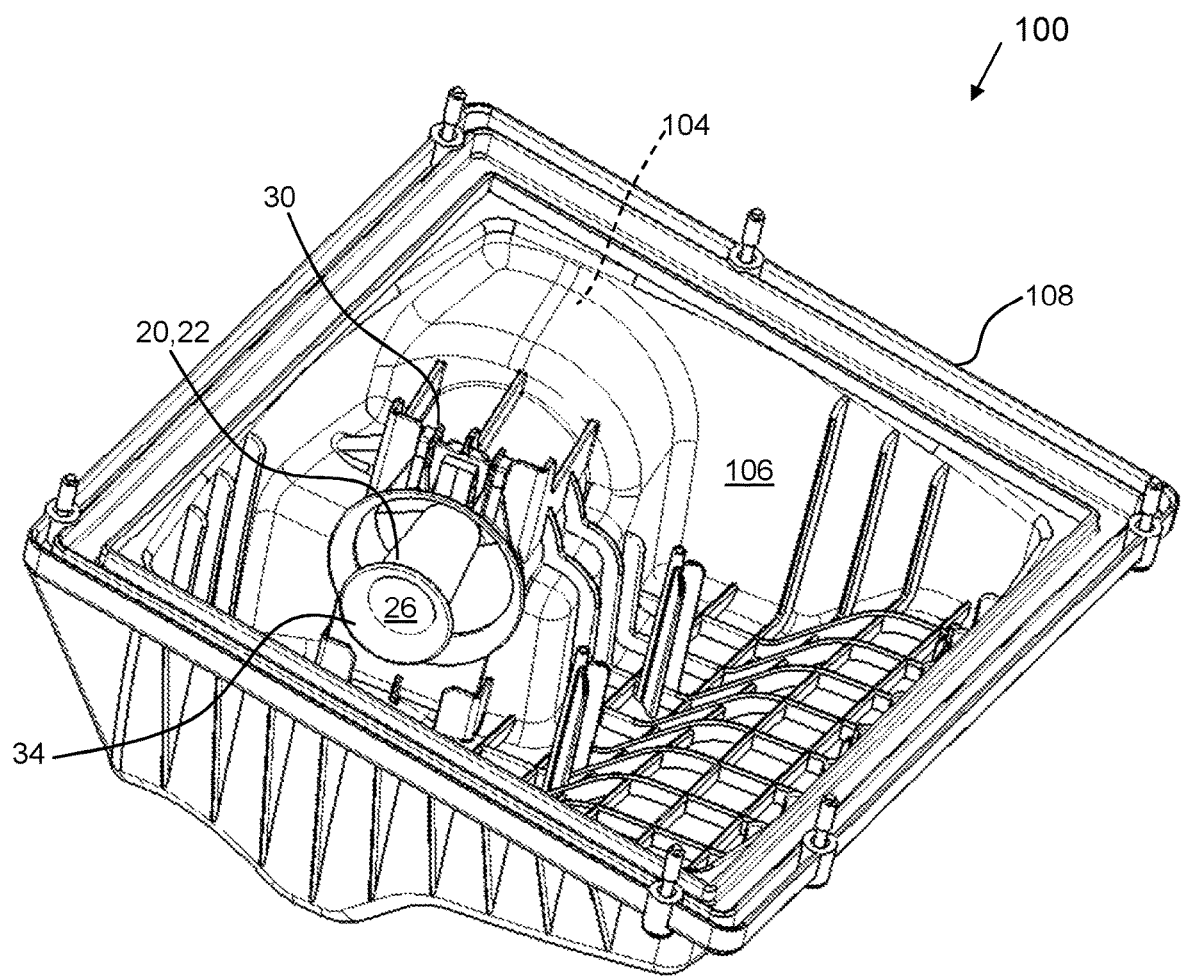
FIG. 2 shows an interior view of a part of a housing of a fluid conducting system according to the embodiment of the invention illustrated in FIG. 1 with a fluid conducting element comprising a fluid channel section arranged in front of a sensor and conducting a portion of a fluid flow to the sensor.

In FIG. 2, an interior view of a part of a housing 108 of a fluid conducting system 100 according to the embodiment of the invention illustrated in FIG. 1 is illustrated with a fluid conducting element 20 comprising a fluid channel section 22 that is arranged in front of a sensor 50 and conducts a portion of the fluid flow to the sensor 50. The pipe section 30 is arranged in a half shell of the housing 108 and is connected with a hidden outlet 104. In the interior of the pipe section 30 the fluid channel section 22 is arranged as a cone-shaped fluid conducting element 20 that can conduct the fluid flow through the inlet cross section 34 to a sensor 50, not illustrated. The sensor 50 protrudes in the illustrated illustration from below into the fluid channel section 22.

Figure 3:
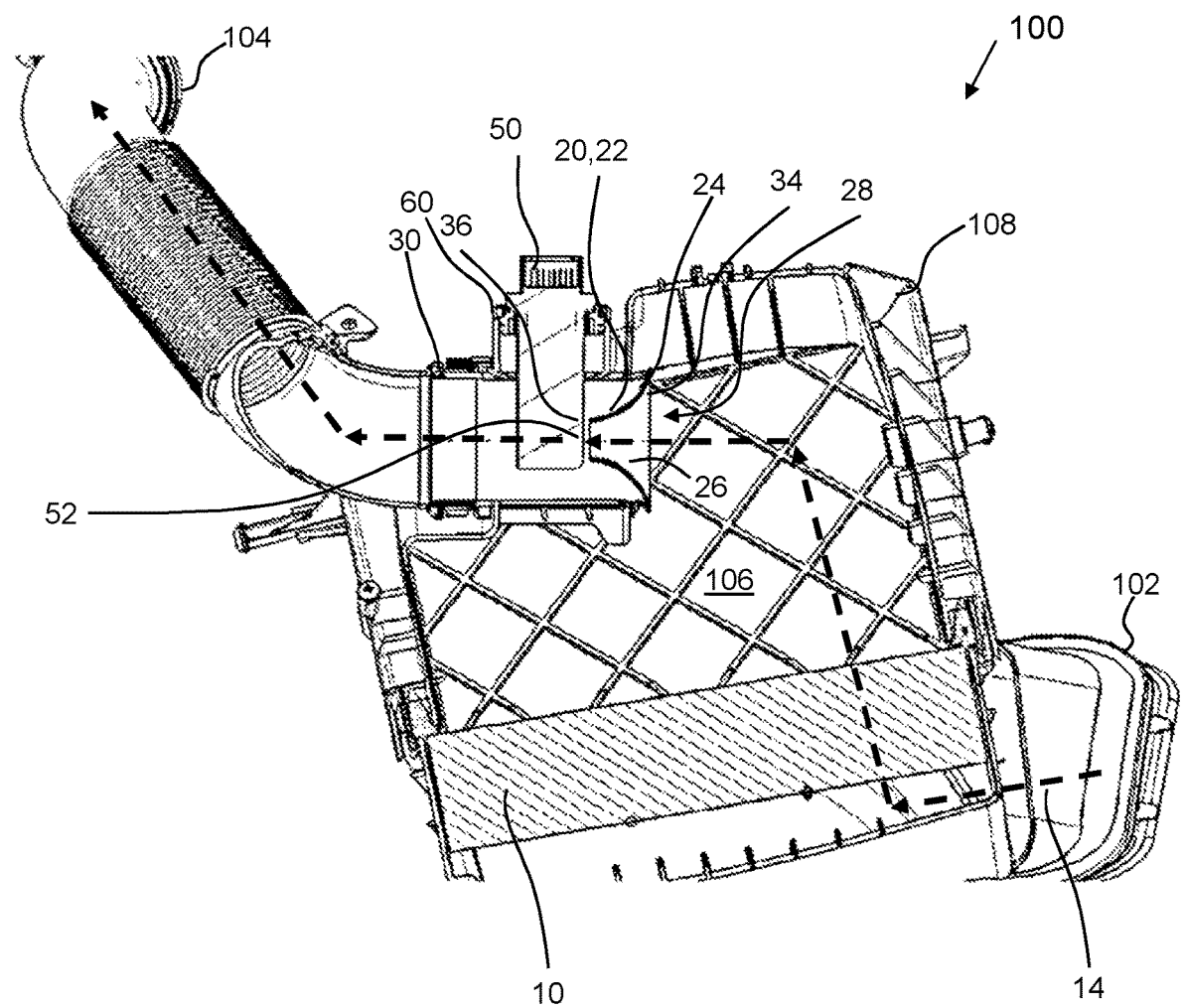
FIG. 3 shows a schematic cross section of a fluid conducting system according to a further embodiment of the invention with a fluid conducting element comprising a fluid channel section arranged in front of a sensor and conducting a total flow cross section of a fluid flow to the sensor.

FIG. 3 shows a schematic cross section of a fluid conducting system 100 according to a further embodiment of the invention with a fluid conducting element 20 comprising a fluid channel section 22 that is arranged in front of a sensor 50 and conducts a total flow cross section 28 of a fluid flow to the sensor 50. In this configuration of the fluid conducting system 100, in contrast to the embodiment illustrated in FIGS. 1 and 2, the entire fluid flow that is flowing to the outlet 104 is conducted through the inlet cross section 34 of the fluid conducting element 20 to the sensor surface 52 of the sensor 50. By constricting the flow cross section within the fluid conducting element 20, the flow rate of the fluid flow is significantly increased and in this way the measuring precision of the determination of the fluid masses and/or volume values is improved.

Figure 4:
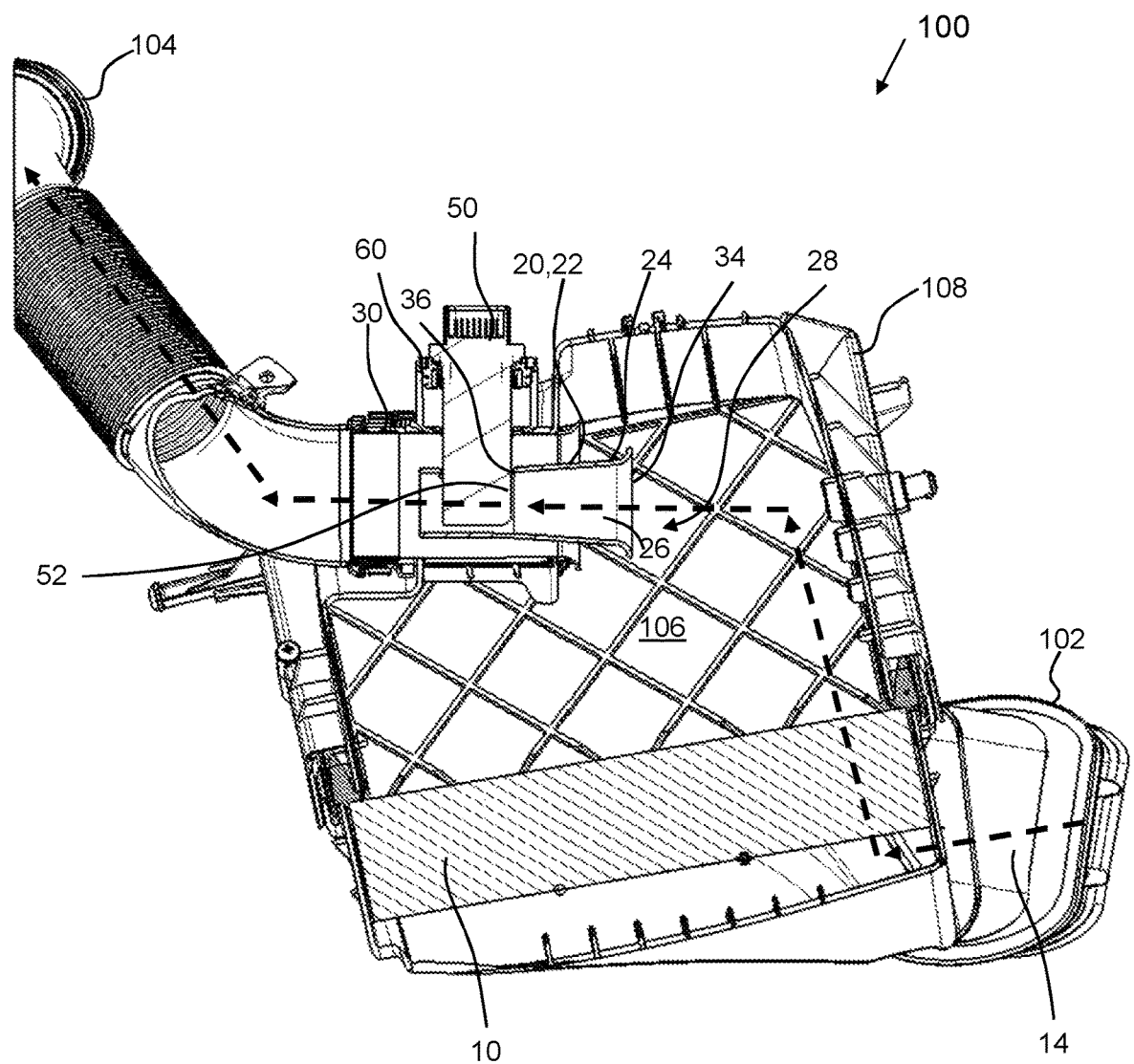
FIG. 4 shows a schematic cross section of a fluid conducting system according to another embodiment of the invention with a fluid conducting element comprising a fluid channel section conducting a portion of a fluid flow to the sensor which is arranged with a sensor surface in the fluid conducting element.

In FIG. 4, a schematic cross section of a fluid conducting system 100 according to another embodiment of the invention is illustrated with a fluid conducting element 20 comprising a fluid channel section 22 which conducts a portion of a fluid flow to the sensor 50 which is arranged with a sensor surface 52 in the fluid conducting element 20. In this configuration, the sensor 50 is arranged with a portion of its sensor surface 52 within the fluid conducting element 20. The fluid flow in this context is still guided through the fluid conducting element 20 even downstream of the sensor 50 so that at the location of the sensor surface 52 an additional homogenization of the flow of the fluid is achieved. In this configuration of the fluid conducting system 100, the sensor 50 is also arranged so as to be exchangeable from the exterior in the pipe section 30 as well as in the fluid channel section 22 as a component of the fluid conducting element 20. A portion of the flowing fluid flows in the cross section between the fluid conducting element 20 and the pipe section 30 externally past the fluid conducting element 20.

Figure 5:
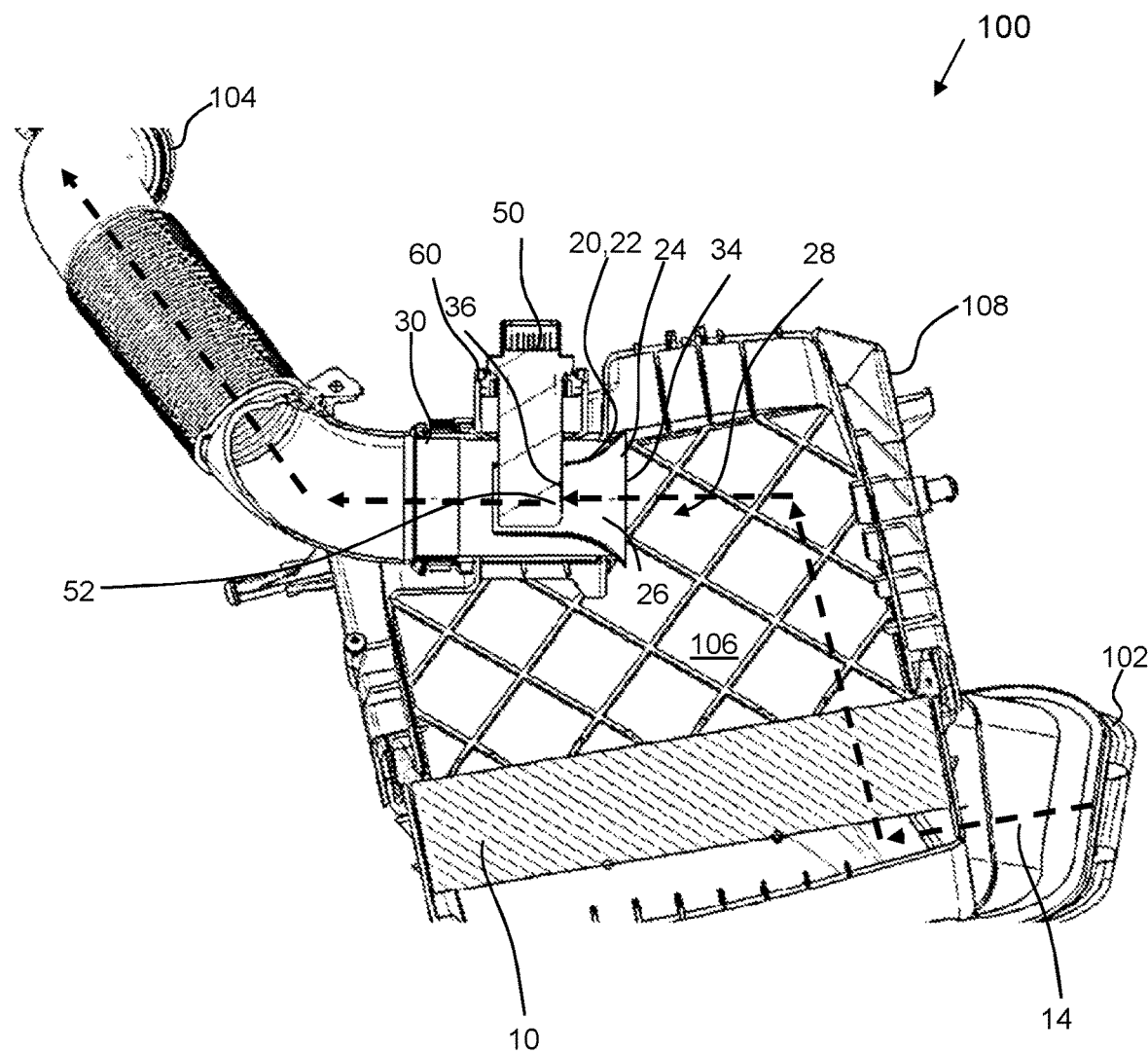
FIG. 5 shows a schematic cross section of a fluid conducting system according to a further embodiment of the invention with a fluid conducting element comprising a fluid channel section conducting a total flow cross section of a fluid flow to the sensor which is arranged with a sensor surface in the fluid conducting element.

FIG. 5 shows a schematic cross section of a fluid conducting system 100 according to another embodiment of the invention with a fluid conducting element 20 comprising a fluid channel section 22 which conducts a total flow cross section 28 of a fluid flow to the sensor 50 which is arranged with a sensor surface 52 in the fluid conducting element 20. This embodiment is similar to the embodiment illustrated in FIG. 4. In this case, the inlet cross section 34 of the fluid conducting element 20 however captures the total flow cross section 28 of the fluid flow and conducts it to the sensor surface 52 which is arranged in the interior 26 of the fluid conducting element 20. This fluid conducting element 20 is continued downstream of the sensor 50 in order to achieve an increased homogenization of the fluid flow.

What is claimed is:

1. A fluid conducting system for transport of a fluid, the fluid conducting system comprising:
   a filter housing having:
      a housing outer wall;
      an inlet port receiving fluid to be filtered; and
      an outlet port through which filtered fluid exits from housing;
   a filter element for filtering the fluid arranged in an interior of the filter housing;
   the filter housing further comprising:
      a tubular outlet pipe extending from a first end at an exterior of the filter housing, through the housing outer wall of the filter housing and projecting inwardly from an interior side of the housing outer wall to extend along an inner surface of the housing outer wall to a radially outwardly flared end, positioned between the filter element and the inner surface of the housing outer wall;
      wherein the radially outwardly flared end forms a first inflow tulip for receiving filtered fluid from the filter element; and
      wherein the tubular outlet pipe at the interior of the filter housing has a sensor insertion opening for receiving a flow sensor into a flow sensor receiving chamber provided in an interior of the tubular outlet pipe in the interior of the filter housing, the flow sensor extending from the exterior of the filter housing, through the housing outer wall and into the flow sensor receiving chamber;

a conically tapering sensor flow acceleration pipe having a circumferentially closed conical wall, arranged coaxially in the interior of the tubular outlet pipe and extending outwardly beyond the outwardly flared second end of the tubular outlet pipe to form a second radially outwardly flared end, forming a second inflow tulip, the second inflow tulip positioned between the filter element and the inner surface of the housing outer wall;

wherein the conically tapering sensor flow acceleration pipe has:
an outlet opening positioned at the flow sensor receiving chamber within the tubular outlet pipe and facing a flow sensing surface of the flow sensor;
an inlet opening formed by the second inflow tulip;
wherein the conically tapering sensor flow acceleration pipe is completely circumferentially closed from the outlet opening to the inlet opening;

wherein the conically tapering sensor flow acceleration pipe has an interior diameter that tapers continuously, the interior cross section reducing to accelerate fluid flow velocity at the flow sensing surface of the flow sensor.

2. The fluid conducting system according to claim 1, wherein
an annular flow gap is formed by spacing between an outer wall of the conically tapering sensor flow acceleration pipe and the tubular outlet pipe;
wherein the annular flow gap conducts a first portion of filter fluid flow around an exterior of the conically tapering sensor flow acceleration pipe;
wherein an interior of the conically tapering sensor flow acceleration pipe conducts a different second portion of the filter fluid flow in the tubular outlet pipe.

3. The fluid conducting system according to claim 2, further comprising:
the flow sensor inserted into the flow sensor receiving camber through the sensor insertion opening, the flow sensor extending through the housing outer wall so the flow sensor is exchangeable from the exterior of the housing.

4. The fluid conducting system according to claim 1, wherein
the second radially outwardly flared end of the conically tapering sensor flow acceleration pipe covers an end of the tubular outlet pipe such that the conically tapering sensor flow acceleration pipe captures all fluid flow in the tubular outlet pipe.

5. The fluid conducting system according to claim 1, wherein
a cross section of an inner wall of the conically tapering sensor flow acceleration pipe is designed with an aerodynamic profile that increases the flow rate.

\* \* \* \* \*